(12) United States Patent
Anand AG et al.

(10) Patent No.: US 8,826,261 B1
(45) Date of Patent: Sep. 2, 2014

(54) PROGRAMMING PROCESSORS THROUGH CAN INTERFACE WITHOUT CHANGING THE BOOT MODE SELECT PINS

(75) Inventors: Vishal Anand AG, Bangalore (IN); Jayanth Moodliar, Bangalore (IN)

(73) Assignee: Bloom Energy Corporation, Sunnyvale, CA (US)

( * ) Notice: Subject to any disclaimer, the term of this patent is extended or adjusted under 35 U.S.C. 154(b) by 223 days.

(21) Appl. No.: 13/033,990

(22) Filed: Feb. 24, 2011

Related U.S. Application Data (60) Provisional application No. 61/282,528, filed on Feb. 25, 2010.

(51) Int. Cl.
*G06F 9/44* (2006.01)

(52) U.S. Cl.
USPC ............................ 717/168; 717/173; 712/243

(58) Field of Classification Search
USPC .................................. 717/168, 173; 712/243
See application file for complete search history.

(56) References Cited

U.S. PATENT DOCUMENTS

| | | | | |
|---|---|---|---|---|
| 5,432,938 | A * | 7/1995 | Ohashi ............................... | 713/1 |
| 6,754,895 | B1 * | 6/2004 | Bartel et al. .................. | 717/171 |
| 7,596,721 | B1 * | 9/2009 | Flake et al. ...................... | 714/42 |
| 7,599,760 | B2 | 10/2009 | Dutta et al. | |
| 2004/0088531 | A1 * | 5/2004 | Rothman ........................... | 713/1 |
| 2006/0031577 | A1 * | 2/2006 | Peluso et al. .................. | 709/243 |
| 2006/0117313 | A1 * | 6/2006 | Yeh et al. ....................... | 717/168 |
| 2006/0248329 | A1 * | 11/2006 | Swanson et al. ............. | 713/100 |
| 2007/0142926 | A1 * | 6/2007 | Hopsecger ....................... | 700/10 |
| 2009/0007089 | A1 * | 1/2009 | Rothman et al. .............. | 717/168 |
| 2009/0222242 | A1 * | 9/2009 | Kodama ........................ | 702/188 |
| 2011/0143661 | A1 * | 6/2011 | Hartwig et al. .............. | 455/41.1 |

OTHER PUBLICATIONS

Isao et al. "FieldMate Field Device Management Tool for the New Era" Yokogawa Technical Report, English Version 2007, pp. 9 -12.*
Scharbarg et al. "CAN—Ethernet Architectures for Real-Time Applications", IEE, 2205, pp. 245-252.*
U.S. Appl. No. 11/656,006, "Modular Fuel Cell System," filed Jan. 22, 2007; K.R. Sridhar.
TMS320C645x/C647x DSP Users Guide, Texas Instruments, Mar. 2006, Revised Aug. 2010, 60pgs.
TMS320C6472 Fixed-Point Digital Signal Processor, Texas Instruments, Product Preview, Jun. 2009, Revised Oct. 2010, 266pgs.
TMS320F2808, TMS320F2806, UCD9501, Texas Instruments, Digital Signal Processors, Product Preview, Mar. 2005, 69pgs.
TMS320x280x, 2801x, 2804x Boot ROM, Texas Instruments, Reference Guide, Nov. 2004, Revised Oct. 2006, 94pgs.

* cited by examiner

*Primary Examiner* — Li B Zhen
*Assistant Examiner* — Viva Miller
(74) *Attorney, Agent, or Firm* — The Marbury Law Group PLLC (57) ABSTRACT

Methods, systems and devices for remotely updating software installed on a digital signal processor (DSP) without setting the mode select pins on the DSP control card. Firmware configured to suspend operations upon receiving a programming signal is installed on the processor. A controlling computing device send the programming signal, causing the processor to halt execution, erase portions of the firmware, set an update firmware flag, and send control signals to the controlling computing device. The remote computing device sends updated firmware and an application program cyclic redundancy check to the processor. The processor compares a cyclic redundancy check of an on-chip flash memory with the received application program cyclic redundancy check. If the two match, the processor installs the received firmware, unsets the update firmware flag, and restarts itself.

11 Claims, 8 Drawing Sheets

FIG. 1

| | Mode | Description | GPIO18 | GPIO29 | GPIO34 |
|---|---|---|---|---|---|
| 202 | Boot to Flash | Jump to Flash Address 0x3F 7FF6 | 1 | 1 | 1 |
| 204 | SCI-A Boot | Load a data stream from SC-A | 1 | 1 | 0 |
| 206 | SPI-A Boot | Load from an external serial SPI EEPROM on SPI-A | 1 | 0 | 1 |
| 208 | I2C Boot | Load data from an external serial EEPROM at address 0x50 on I2C bus | 1 | 0 | 0 |
| 210 | eCAN-A Boot | eCAN-A Boot Call CAN Boot to load from eCAN-A mailbox | 0 | 1 | 1 |
| 212 | Boot to M0 SARAM | Jump to M0 SARAM address 0x00 0000 | 0 | 1 | 0 |
| 214 | Boot to OTP | Jump to OTP address 0x3D 7800 | 0 | 0 | 1 |
| 216 | Parallel I/O Boot | Load data from GPIO0 - GPIO15 | 0 | 0 | 0 |

PROGRAMMING PROCESSORS THROUGH CAN INTERFACE WITHOUT CHANGING THE BOOT MODE SELECT PINS

CROSS REFERENCE TO RELATED PATENT APPLICATION

This application claims the benefit of U.S. Provisional Application No. 61/282,528, filed Feb. 25, 2010, incorporated herein by reference in its entirety.

FIELD OF INVENTION

The present invention relates generally to methods, systems and devices for remotely programming a microprocessor. Specifically, the present invention relates to methods, systems and devices for remotely updating software/firmware installed on a digital signal processor (DSP) integrated in an electronic system, such as a fuel cell power generation system.

BACKGROUND OF THE INVENTION

A digital signal processor (DSP) is a microprocessor with a specialized architecture that is optimized for high-speed digital signal processing. Digital signal processors must be programmed using a hardware specific low-level programming language. Furthermore, prior to programming, the microprocessor must be placed into one of a number of specialized programming modes. Placing the digital signal processor into one of the specialized programming modes requires manually setting jumpers and/or "mode select" pins by physically accessing the circuit board containing the DSP. As more and more DSPs are being integrated into complex electronic systems installed in the field, physical access to DSPs is becoming ever more cost and labor intensive.

SUMMARY OF THE INVENTION

The various embodiments provide methods, systems and devices for remotely updating software installed on a processor. In an embodiment, firmware configured to suspend operations upon receiving a programming signal is installed on the processor. The processor may be configured to halt execution of the firmware, erase portions of the firmware, set an update firmware flag, and send a start programming acknowledgment signal to a remote computing device and/or server in response to receiving the programming signal. The processor may be further configured to wait for updated firmware in response to sending the start programming acknowledgment signal and send an updated firmware received acknowledgment signal in response to receiving the updated firmware.

In various embodiments, the processor may be configured to wait for an application program cyclic redundancy check and a programming complete signal in response to sending the updated firmware received acknowledgment signal. The processor may be configured to perform a cyclic redundancy check of an on-chip memory in response to receiving the programming complete signal. The processor may be configured to compare the cyclic redundancy check of the memory with the received application program cyclic redundancy check to determine whether the cyclic redundancy check of the memory matches the application program cyclic redundancy check.

In various embodiments, the processor may be configured to install the received updated firmware, unset the update firmware flag, and restart itself in response to determining that application program cyclic redundancy check matches the cyclic redundancy check of the memory. In various embodiments, a controller area network to Ethernet (C2E) converter card may be connected to the receiver device. The C2E converter card may be configured to receive the programming signal, the programming complete signal, the updated firmware, and the application program cyclic redundancy check in an Ethernet-based message format and send the received programming signal, the programming complete signal, the updated firmware, and the application program cyclic redundancy check to the processor in a controller area network format.

In an embodiment, a server may be configured to update firmware on a remote processor. The server may be configured to send a programming signal to suspend operations of firmware executing on the remote processor, receive a start programming acknowledgment signal in response to sending the programming signal, send updated firmware application code in response to receiving the start programming acknowledgment signal, receive a updated firmware received acknowledgment signal in response to sending the updated firmware application code, send an application program cyclic redundancy check and a programming complete signal in response to receiving a updated firmware received acknowledgment signal, and receive a programming complete acknowledgment signal in response to sending programming complete signal. In various embodiments, the server may include a transceiver is connected to controller area network to Ethernet (C2E) converter card, the C2E converter card being configured to receive the programming signal, the programming complete signal, the updated firmware, and the application program cyclic redundancy check in an Ethernet-based message format and send the received programming signal, the programming complete signal, the updated firmware, and the application program cyclic redundancy check to the remote processor in a controller area network format.

The various embodiments provide methods for remotely updating firmware on a processor connected to a remote computing device through a controller area network by executing, on the processor, firmware configured to suspend operations upon receiving a programming signal; receiving, in the processor, a programming signal sent from the remote computing device through the controller area network; halting execution of the firmware, erasing portions of the firmware, setting an update firmware flag, and sending a start programming acknowledgment signal to the computing device in response to receiving the programming signal; receiving, in the processor, updated firmware sent from the computing device through the controller area network, the updated firmware being sent in response to computing device receiving the start programming acknowledgment signal; receiving, in the processor, an application program cyclic redundancy check and a programming complete signal sent from the computing device through the controller area network; performing a cyclic redundancy check of an on-chip flash memory of the processor in response to receiving the programming complete signal; comparing the cyclic redundancy check of the on-chip flash memory with the received application program cyclic redundancy check to determine whether the cyclic redundancy check of the on-chip flash memory matches the application program cyclic redundancy check; and installing the received updated firmware on the processor, unsetting the update firmware flag, and restarting the processor in response to determining that application program cyclic redundancy check matches the cyclic redundancy check of the on-chip flash memory.

Various embodiments provide a non-transitory computer readable storage medium having stored thereon processor-executable software instructions configured to cause a computing device processor to perform operations including: executing firmware configured to suspend operations upon receiving a programming signal; receiving a programming signal from the controller area network; halting execution of the firmware, erasing portions of the firmware, setting an update firmware flag, and sending a start programming acknowledgment signal to the computing device in response to receiving the programming signal; receiving updated firmware in response to sending the start programming acknowledgment signal; sending an updated firmware received acknowledgment signal; receiving an application program cyclic redundancy check and a programming complete signal in response to sending the updated firmware received acknowledgment signal; performing a cyclic redundancy check of the memory in response to receiving the programming complete signal; comparing the cyclic redundancy check of the memory with the received application program cyclic redundancy check to determine whether the cyclic redundancy check of the memory matches the application program cyclic redundancy check; and installing the received updated firmware, unsetting the update firmware flag, and restarting the processor in response to determining that application program cyclic redundancy check matches the cyclic redundancy check of the memory.

Various embodiments provide a method of using a controller area network to remotely update application programs of a physically inaccessible processor housed in fuel cell system from a control center, without changing the pin settings of the processor and without requiring any physical contact with the fuel cell system housing the processor.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE EMBODIMENTS

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The phrase "physical contact" is used herein to mean bodily contact between two tangible entities, such as between a human and a computing device, fuel cell module, processor and/or circuit board.

The terms "firmware" and "software" are used generically and interchangeably herein to refer to any set of programs, procedures and/or algorithms that may executed by a computing device to perform operations and/or tasks, either by directly providing instructions to the computing device hardware or by serving as input to another piece of software. When possible, the term "software" is used to reference more high-level programs, whereas the term "firmware" is used refer to lower-lever programs that are typically executed on start-up to initialize the hardware and/or used to control the more fundamental operations of the hardware components. However, it should be noted that these terms are used generically and interchangeably throughout this application and the use of these terms is not intended limit the scope of the application or claims in any way.

Various embodiments utilize a controller area network (CAN), such as a controller for a fuel cell system. A controller area network (CAN), as used in this application, may refer a number of interconnected components that implement a set of standards designed to allow processors, microcontrollers and/or devices to communicate with each other without a host computer. The term "CAN" is also used in this application to refer to a generic medium over which a message based protocol (e.g., a CAN protocol) may be used for communication.

A number of different digital signal processor chips and standards are available or contemplated in the future, all of which may implement and benefit from the various embodiments. For ease of reference, the various embodiments are described with reference to TMS320F280X and UCD950X family of chips manufactured by Texas Instruments®. However, any references to TMS320F280X and UCD950X terminology and technical details are for illustrative purposes only and are not intended to limit the scope of the claims to a particular digital signal processor chip, technology or manufacturer unless specifically recited in the claim language.

The various embodiments provide methods, systems and devices for remotely updating software installed on a digital signal processor (DSP). Many modern electronic devices and systems, such as fuel cell power generation systems, include a control card having an integrated digital signal processor. The digital signal processor control card (herein DSP control card) is usually integrated into the electronic device and/or system, and used in a local control system of the device/system to perform high-speed signal processing. An example of a local control system in an input/output (i.e., power conditioning) module of a solid oxide fuel cell system described in U.S. application Ser. No. 11/656,006 filed on Jan. 22, 2007 and incorporated by reference herein in its entirety. The exemplary system contains the input/output module, a fuel processing module (e.g., desulfurizer module), and plural fuel cell modules containing fuel cell stacks, and each module may be located in a separate housing or cabinet. In many such devices/systems, the control system of the DSP must be upgraded with new software after the device/system has been deployed. However, in order to upgrade the software, the digital signal processor must first be placed in a specialized programming mode, which requires manually setting one or more jumpers and/or "mode select" pins on the processor or DSP control card. Since the DSP control cards are typically integrated into their respective electronic system and/or device, placing a DSP into a specialized programming mode requires a technician to disassemble the sub-assemblies of the electronic system housing the DSP, physically access the DSP card, and manually set the "mode select" pins of the processor. The various embodiments provide methods, systems and devices for remotely updating the control system software without requiring physical access to the DSP control card, thereby avoiding the laborious process of disassembling the sub-assemblies of the electronic system to set the mode select pins on the DSP control card.

Figure 1:
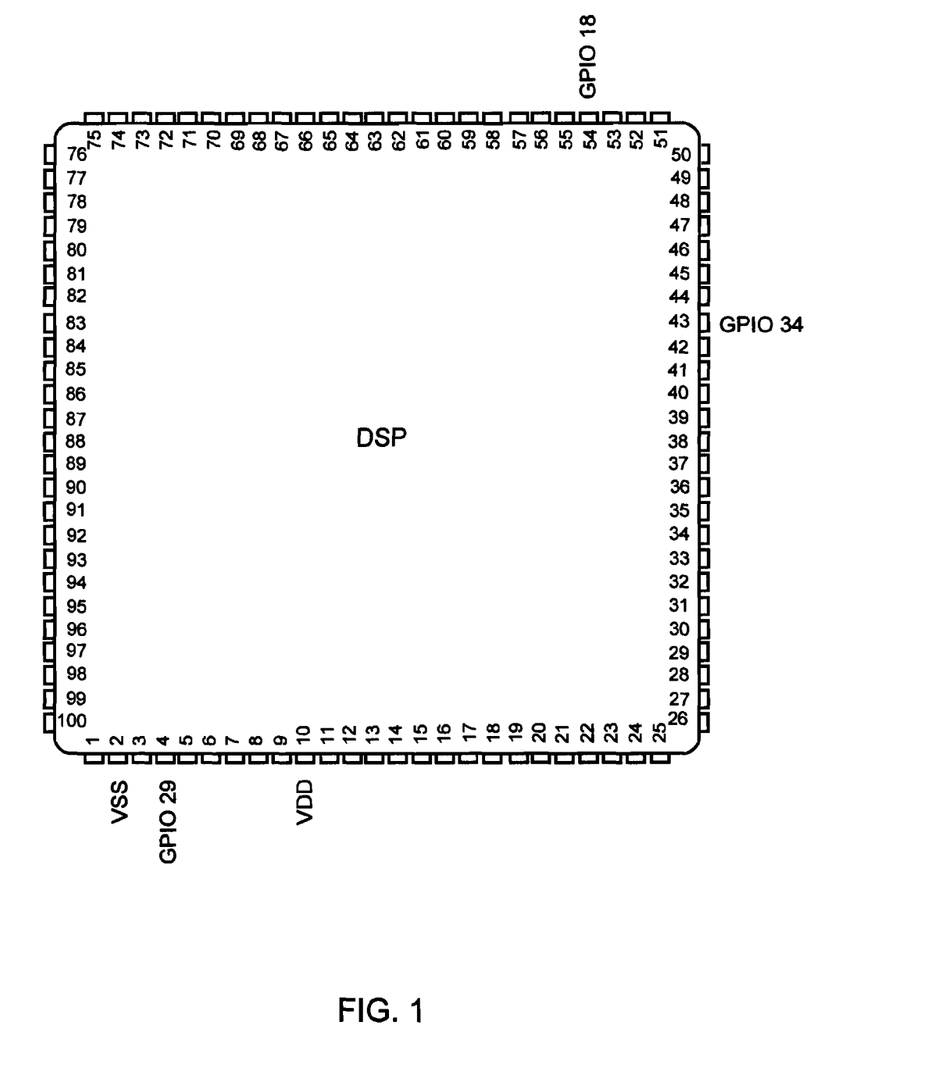
FIG. 1 is an exemplary 100-pin digital signal processor (DSP) chip that may be programmed in accordance with the various embodiments.

FIG. 1 illustrates an exemplary 100-pin digital signal processor (DSP) chip in accordance with the various embodiments. The DSP chip may include a number of general input/output (GPIO) pins and various on-chip memories, such as a single-access random access memory (SARAM), an on-chip Flash memory (Flash), and a boot read-only memory (boot ROM). The boot ROM memory is a portion of the on-chip memory that is factory-programmed with boot-loading software that initializes and configures the processor on each reset or power up. The boot-loading software executes different initialization routines and instruction sets (i.e., software) based on the chip settings. For example, the boot-loading software may instruct the DSP to load a default factory-programmed initialization routine, download a new instruction set from an external connection, or to select and execute an instruction set from on-chip Flash memory. In order to determine what instruction set to execute (i.e., what boot mode to use), the boot-loading software checks the status of one or more boot mode select pins on the DSP chip. Since the state of the boot mode select pins are only checked at designated times (e.g., reset, power-up, etc.), one or more of the GPIO pins may be used as the boot mode select pins. For example, the DSP chip illustrated in FIG. 1 includes three GPIO pins GPIO 18, GPIO 29, GPIO 34 that may be used as the boot mode select pins. Thus, in the illustrated example, on reset or power-up the boot-loading software may determine which of boot mode select pins GPIO 18, GPIO 29, GPIO 34 are set (e.g., a high voltage on the pin, pin value='1', etc.) and select a boot mode based on the values of the GPIO 18, GPIO 29 and GPIO 34 pins.

Figure 2:
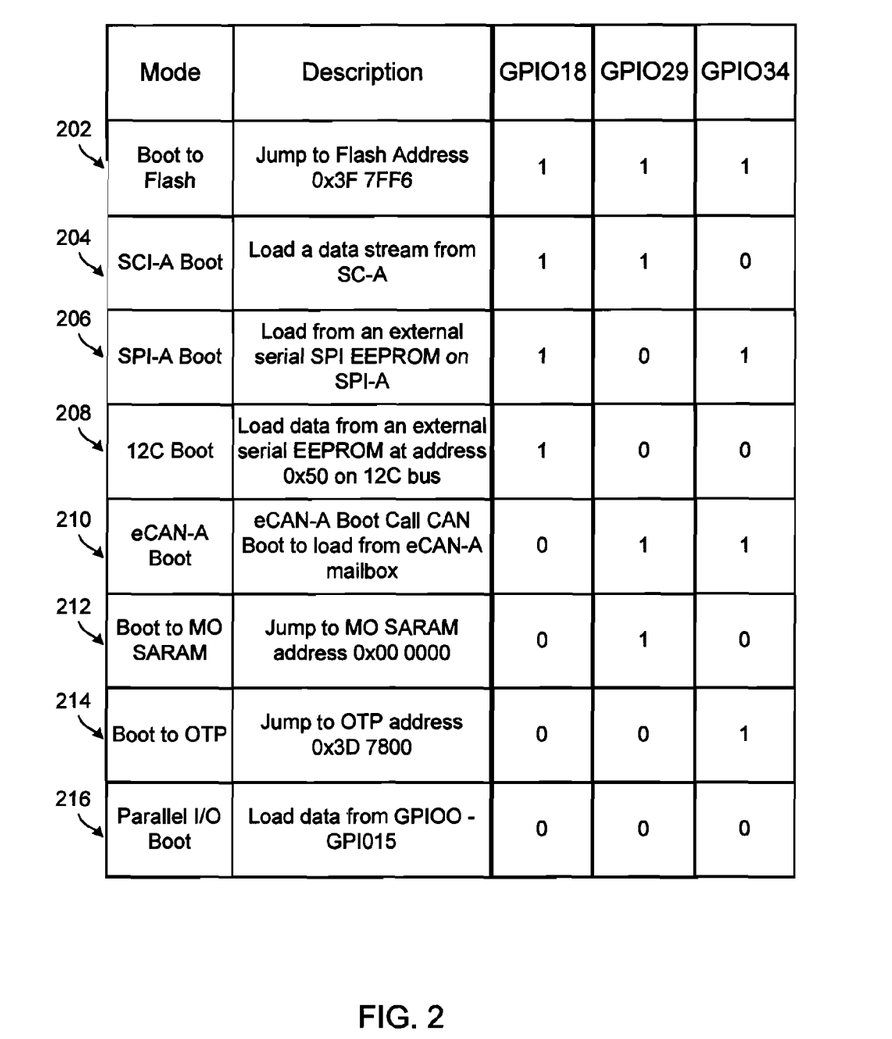
FIG. 2 is an example mode selection table illustrating the various boot modes that may be selected by setting the values on boot mode select pins.

FIG. 2 is an example mode selection table illustrating the various boot modes that may be selected by setting the values on the boot mode select pins. FIG. 2 illustrates that using three mode select pins, such as the GPIO 18, GPIO 29 and GPIO 34 pins discussed above with reference to FIG. 1, allows the digital signal processor to choose between one of eight different boot modes: Boot to Flash 202, SCI-A Boot 204, SPI-A Boot 206, I2C Boot 208, eCAN-A Boot 210, Boot to MO SARAM 212, Boot to OTP 214, and Parallel I/O Boot 216. In the illustrated example of FIG. 2, setting all three of the boot mode select pins high (GPIO 18=1, GPIO 29=1, GPIO 34=1) causes the Boot to Flash 202 mode to be selected and the boot-loading software to execute code from the Flash memory upon power-up or reset. In many DSP systems, this Boot to Flash 202 mode is the default boot mode, and software/firmware located in designated areas of the on-chip flash memory will be executed on power up or reset, unless the values of one or more boot mode select pins are expressly changed.

As discussed above, in addition to the default boot mode (e.g., executing code from on-chip Flash memory), the boot-loading software may be instructed to load and/execute software from various different resources and/or external devices, such as an external Electrically Erasable Programmable Read-Only Memory (EEPROM). To facilitate this feature, the various boot modes (e.g., SCI-A Boot 204, SPI-A Boot 206, I2C Boot 208, eCAN-A Boot 210) accommodate different system requirements and provide the DSP with a variety of different ways to access external devices and resources. For example, the DSP may be configured to access resources through a controller area network (CAN) interface by driving the GPIO 18 pin low and the other boot select pins high (e.g., GPIO 18=0, GPIO 29=1, GPIO 34=1). This boot mode pin configuration selects the eCAN-A Boot 210 mode as a boot mode and identifies a memory/resource location from which the boot-loader is to extract and/or execute software on reset or start-up. For example, selecting the CAN-A Boot 210 mode may cause the DSP to extract code from an eCAN mailbox stored in an on-chip Memory RAM, store the extracted code in the Flash memory, and begin execution of the code stored in the Flash.

As discussed above, setting the boot mode select pins to select the CAN-A Boot 210 mode instructs the digital signal processor to load software from an eCAN mailbox on start-up or reset. However, the contents of the eCAN mailbox can only be updated while the DSP operates in a normal operating mode. Therefore updating certain software, such as the DSP's firmware, through the CAN interface requires that an updated software package be sent to the eCAN mailbox while the DSP is in a normal operating mode (e.g., Boot to Flash 202 mode), driving the GPIO 18 pin low and the other boot select mode pins high, and resting/restarting the processor. That is, the value of the GPIO 18 pin cannot be set (e.g., driven low) remotely and requires physical access to the DSP control board. The DSP control boards are typically installed inside an electronic device and/or system (e.g., a fuel cell system) deployed at a customer site. Therefore, updating firmware on a digital signal processor typically requires a field service technician to travel to the customer site, disassemble the electronic system/device housing the DSP control card, set the appropriate boot mode pins on the DSP card, and reboot the system.

The various embodiments utilize features of controller area network (CAN) to update application programs of physically inaccessible DSP cards wirelessly and/or through the internet. That is, the various embodiments allow the DSP's firmware to be updated remotely (e.g., from a control center) without requiring physical access to the DSP and without requiring the disassembly of the units (e.g., the fuel cell systems and/or their control systems) located in the field (e.g., remote from the control center).

Figure 3:
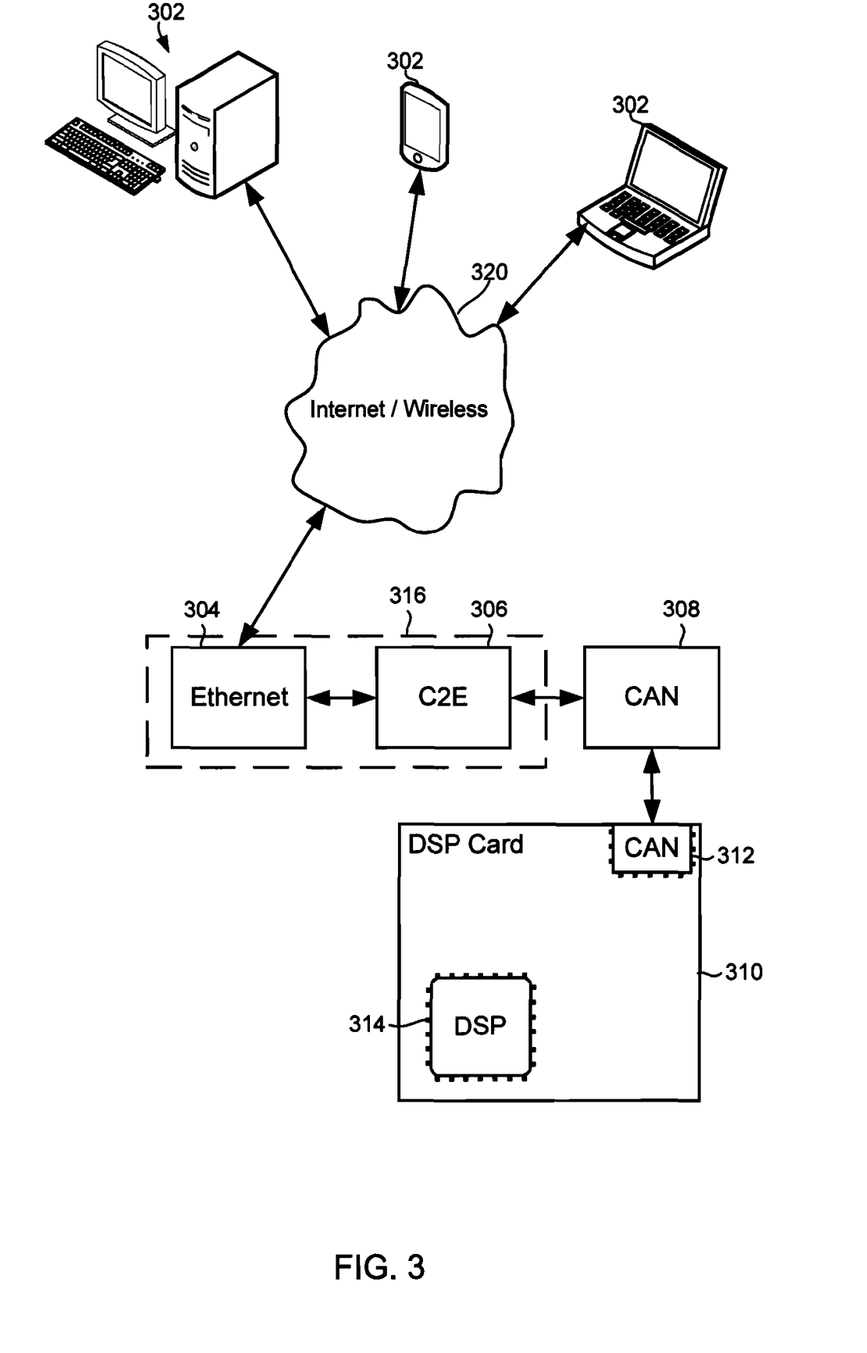
FIG. 3 is a system diagram illustrating exemplary components and information flows that may use used to remotely update software on a digital signal processor (DSP) in accordance with the various embodiments.

FIG. 3 is a system diagram illustrating exemplary components and information flows that may use used to remotely update software on the DSP through the internet in accordance with the various embodiments. As illustrated in FIG. 3, software that is to be installed on the DSP may be transmitted by a remote computing device 302 (e.g., personal computer, laptop, handheld etc.) wirelessly and/or across a network such as the Internet 320, to another computing device connected to the network, such as the illustrated Ethernet networked device 304. The Ethernet networked device 304 may be any computing device capable of receiving information transmitted across the network, and may include an antenna for sending and receiving data via a wireless link. The Ethernet networked device 304 receives the software that is to be installed on the DSP (e.g., through the internet or from a wireless link) and sends the received software to a CAN to Ethernet (C2E) converter card 306 in the form of transmission messages. It should be understood that, in the various embodiments, the Ethernet networked device 304 and the C2E converter card 306 may be implemented in separate devices or in a single computing device 316. In any case, the C2E converter card 306 converts the received messages from the transmission format (e.g., Ethernet protocol) to an appropriate controller area network (CAN) format, such as a format supported by the fuel cell system input/output module CAN protocol.

The C2E converter card 306 sends the controller area network (CAN) formatted data across the CAN medium 308 (e.g., any wired or wireless medium over which CAN protocol based messages may be used for communication) to a CAN port 312 of a digital signal processor card 310. The digital signal processor card 310 transfers the received data from the CAN port 312 to the digital signal processor 314 for processing. In various embodiments, the digital signal processor 314 may be configured to send the computing device 302 various confirmation messages using the reverse of the transmission path used to deliver the data from the computing device 302 to the digital signal processor 314. In various embodiments, the digital signal processor 314 may be configured, either during the manufacturing process via an emulator or thereafter via a software update, to automatically change the control of execution from an application code to a pre-stored boot code upon receiving a programming signal.

Figure 4:
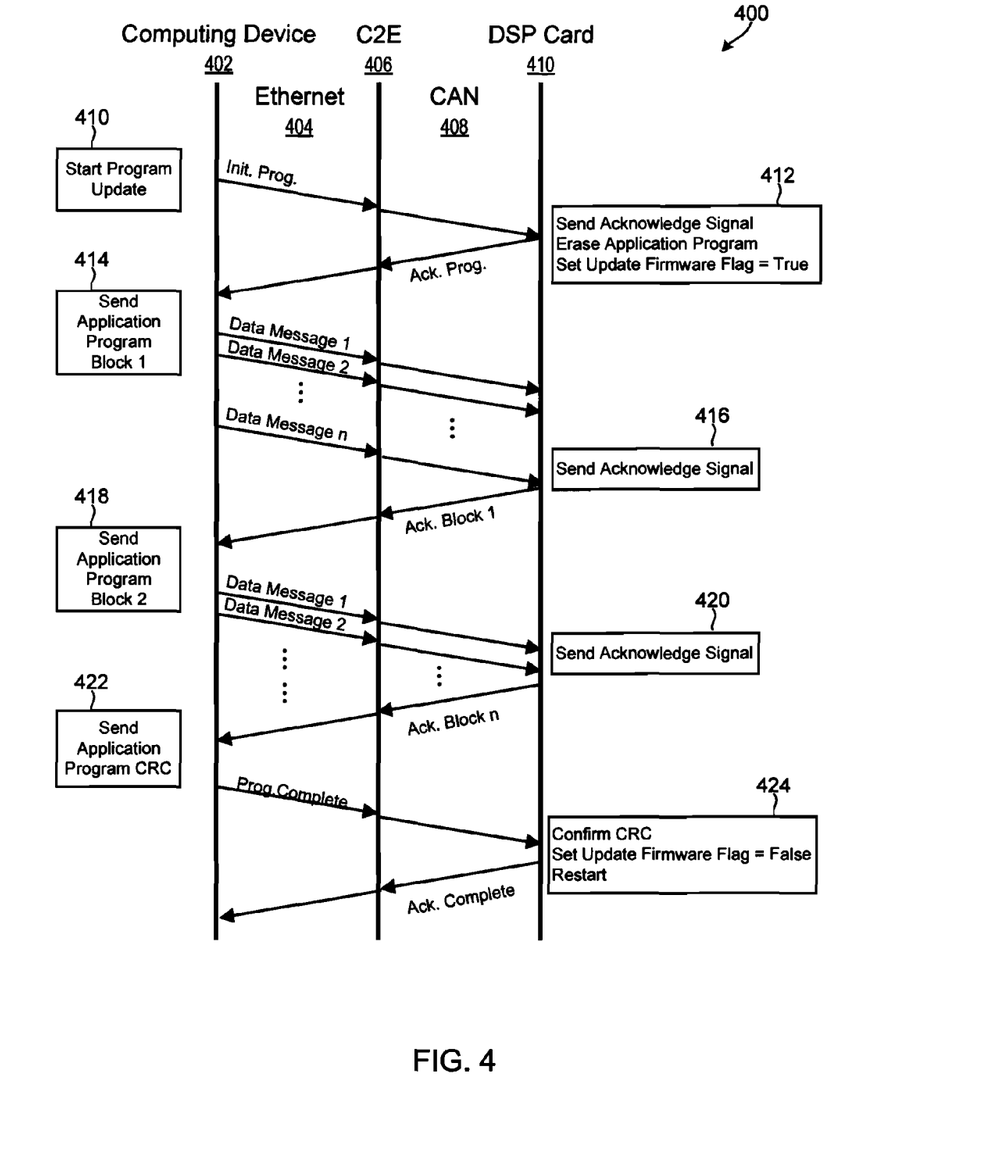
FIG. 4 is a transmission flow diagram of an embodiment method for remotely updating software on a digital signal processor.

FIG. 4 is a transmission flow diagram of an embodiment method 400 for remotely updating firmware on a digital signal processor. As illustrated in FIG. 4, a remote computing device 402 may start the update 410 process by transmitting an initialize programming (Init. Prog.) signal through the Ethernet medium 404 to a CAN to Ethernet (C2E) converter card 406. The C2E converter card 406 processes the signal and transmits the processed signal through the CAN medium 408 to the targeted digital signal processor card 410. Upon receiving the initialize programming (Init. Prog.) signal, the digital signal processor card 410 changes the control of execution to a pre-stored boot code, erases the existing version of the default application program from the flash memory, sets an update firmware flag to be true (Update Firmware Flag=True), and sends the computing device 402 a programming acknowledgment signal (Ack. Prog.). Thus, in the various embodiments, the digital signal processor may be placed in a programming mode remotely, by sending a CAN command from an external device (e.g., the computing device via the C2E converter card 406). Furthermore, once the digital signal processor is placed in programming mode, after the initial application program in the digital signal processor is erased and hand-shaking is established with a server (e.g., the computing device), the digital signal processor may enter an execution state wherein the processor is ready to receive files over the CAN interface and store the received files in a Flash memory.

Returning to FIG. 4, after the digital signal processor card 410 sends the programming acknowledgment signal (Ack. Prog.), the computing device 402 may receive the acknowledgment signal and begin transmitting blocks of data messages 414, 418. In various embodiments, the computing device 402 may configured to pause the transmission of data messages 414, 418 after transmitting a preset number of data message blocks and wait for an acknowledgment signal 416, 418 for each transmitted block. If no acknowledgment is received after a certain amount of time, the computing device may retransmit the data message blocks until an appropriate acknowledgment signal 416, 418 is received. Upon receiving acknowledgment of the last block of the transmitted data (Ack. Block n), the computing device 402 may send the digital signal processor card 410 an application program cyclic redundancy check (CRC) 422 and a programming complete (Prog. Complete) signal. The computing device 402 may then wait a predetermined amount of time for an acknowledgment signal (Ack Complete) indicating programming was successful. If no such acknowledgment signal is received within the predetermined time, the computing device 402 may restart the transmission process.

On the receiver side, after the digital signal processor card 410 receives the programming complete signal (Prog. Complete), the card 410 may perform a CRC of the on-chip flash memory and check the received application program CRC against the CRC of the flash 424. If both these values are the same, the digital signal processor card 410 may determine that the programming was successful and send the computing device 402 an acknowledgment signal (Ack Complete), set the update firmware flag to be false, and restart itself.

Figure 5:
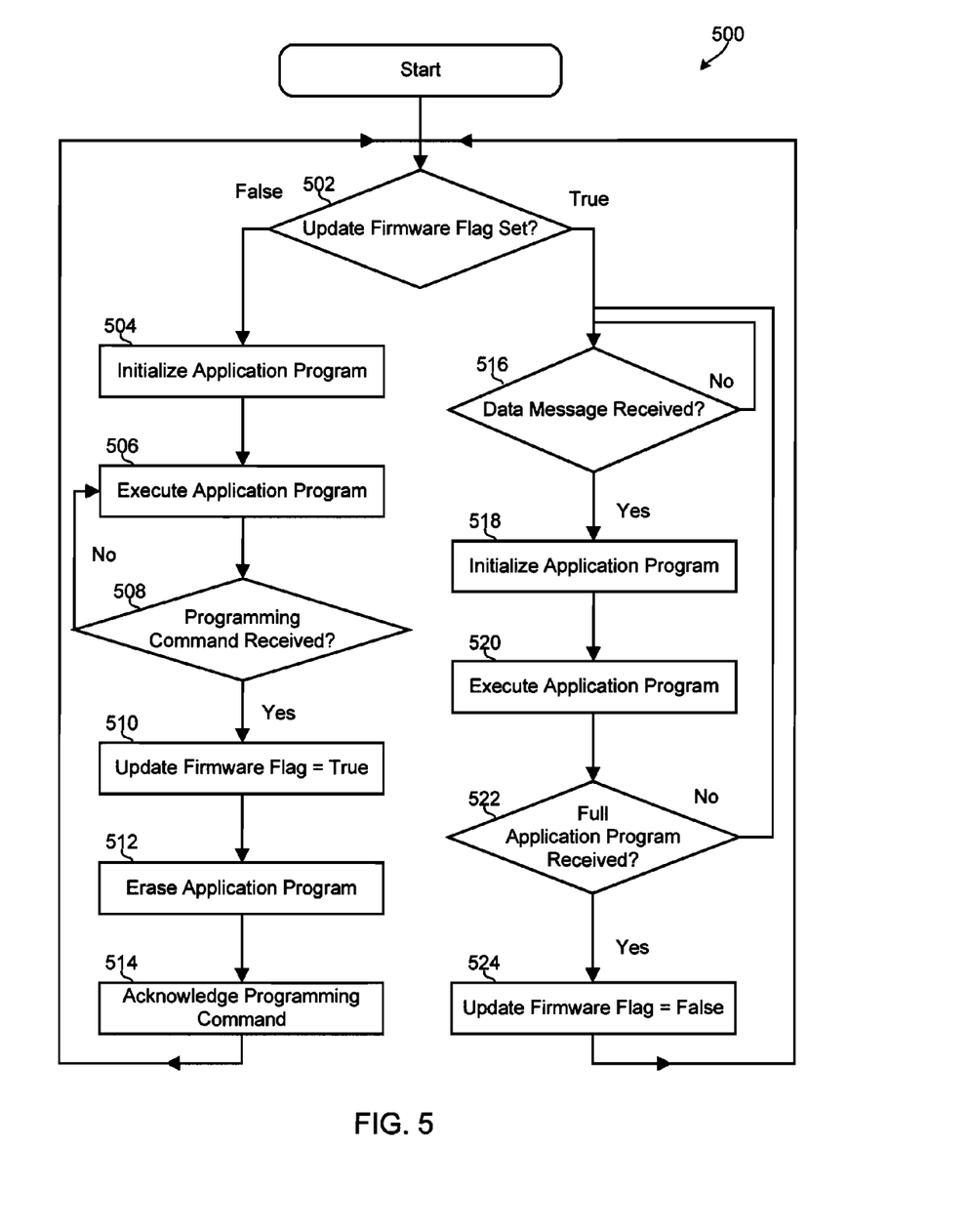
FIG. 5 is a flow diagram of an embodiment method for updating software on a digital signal processor.

FIG. 5 is a flow diagram of an embodiment method 500 for updating software on a digital signal processor through a controller area network (CAN). In determination block 502, after startup or reboot, the digital signal processor checks the status of an update firmware flag to determine if the flag is set. If the update firmware flag is not set (determination block 502=False), the processor boots normally by initializing an application program located at the default boot location in an on-chip flash memory, as illustrated by block 504. In block 506 the processor may begin normal execution of the default application program. During normal execution, the digital signal processor may periodically monitor the status of one or more ports, channels or registers, in determination step 508, to determine if a programming signal/command, such as the initialize programming (Init. Prog.) signal discussed above with reference to FIG. 4, has been received. If a programming signal/command has not been received (determination step 508=False), the processor returns to the execution of the default application program, illustrated in 506. If a programming signal/command has been received (determination step 508=True), the processor may stop further execution of the application program, set the update firmware flag (as illustrated in block 510), and erase the default application program (as illustrated in block 512). In block 514, the processor may send an acknowledgment signal, such as the programming acknowledgment signal (Ack. Prog.) discussed above with reference to FIG. 4 above, and return to block 502 to re-check the status of the update firmware flag. In an embodiment, the processor may be configured to restart itself after sending the programming acknowledgment signal, and recheck the status of the update firmware flag upon restart.

Returning to method 500, if in determination block 502 the digital signal processor determines that the update firmware flag is set (determination block 502=True), the flow continues to block 516 and the processor checks to determine if any data messages have been received. If data messages have not been received (determination block 516="No"), the processor may suspend itself for a predetermined amount of time and return to block 516. If the data messages have been received (determination block 516="Yes"), the processor may process the received data messages and initialize a new application program based on receiving the data messages, as illustrated in block 518. In block 520, the processor may begin executing the initialized application program. In determination block 522, the processor may check to determine if the entire application program has been transmitted and properly received. For example, in determination block 522 the processor may monitor one or more ports, channels and/or registers to determine if an application program cyclic redundancy check (CRC) and a programming complete signal (e.g., Prog. Complete signal discussed above with reference to FIG. 4) have been received. If the processor determines that the full application program has been received (determination block 522="Yes"), the processor may perform a cyclic redundancy check (CRC) of the on-chip flash memory and check the received application program CRC against the CRC of the flash 424. If both these values are the same, the processor may send an acknowledgment signal (e.g., Ack Complete signal discussed above with reference to FIG. 4) and set the update firmware flag to be false, as illustrated in block 522. The processor may then restart itself and/or return to block 502.

It should be noted that, in the embodiment method 500 described above, the setting of the boot mode pins is avoided because the control of the digital signal processor is always in the flash. That is, the communication kernel for handling the controller area network (CAN) programming resides permanently in the digital signal processor. In this manner, the digital signal processor remains in the default boot-to-flash mode, and if a valid program does not reside in the flash memory, digital signal processor can suspend operations until an updated program/firmware is received.

It should also be noted that sending updated firmware in accordance with the various embodiments is different than sending an updated application program. For example, in the various embodiments, after the completion of the programming, the digital signal processor checks for the match between the received firmware file and the firmware residing in the processor. This is done by performing a cyclic redundancy check (CRC) of flash and comparing the CRC of the flash memory against the CRC received from the application. If both these values are the same, the embodiment method 500 identifies that the programming is successful and initiates the execution of the program to start afresh. However, if the updated firmware has changes made to the boot code (e.g., the communication kernel) then the received CRC and the calculated CRC will be different and the check for the CRC will fail.

Figure 6:
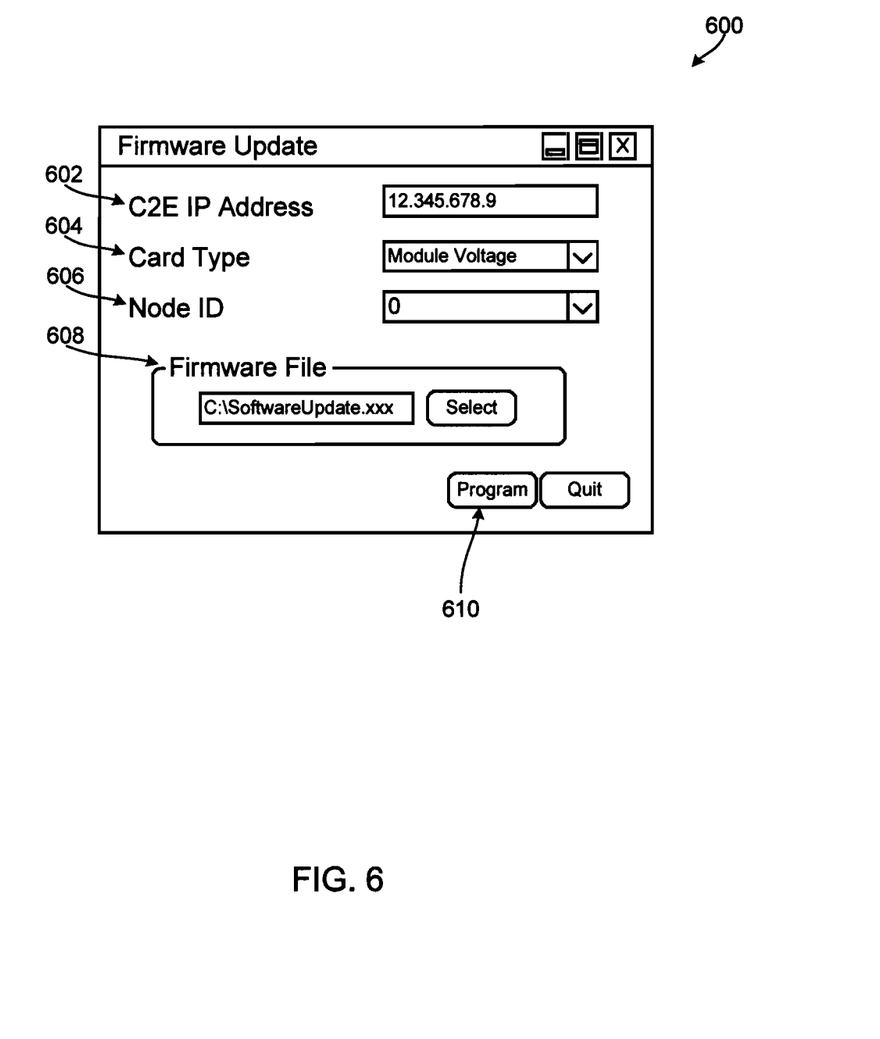
FIG. 6 is an example user interface that may be executed on a computing device to remotely initiate a software install and update on a digital signal processor card.

FIG. 6 is an example user interface 600 that may be executed on a remote computing device, such as computing devices 302 and 402 discussed above, to initiate the software update on a digital signal processor card. As illustrated in FIG. 6, the user interface 600 may contain a CAN to Ethernet (C2E) internet protocol (IP) address field 602, a card type field 604, a node identification field 606, a firmware file selection field 608, and a program button 610. The C2E IP address field 602 allows users to input the internet address of a CAN to Ethernet card for converting Ethernet data transmitted from the computing device into CAN data readable by a DSP card, and vice versa. The card type field 604 allows users to select the type of card to that is to be programmed and may include values such as direct current to direct current (DC/DC) converter card (located in an input/output module of a fuel cell system), a fuel cell module (i.e., module containing fuel cell stacks) input/output control card, a fuel cell module input/output water system card, and an input/output (i.e., power conditioning module) control card, amongst others. The node identification field 606 allows users to select a card to be programmed from a plurality of cards in a CAN network. Specifically, the node identification field 606 may be used differentiate different units using the same code in a single CAN network by designating a number that differentiates the CAN message IDs coming from different units of the same card type connected together in the single CAN network. The firmware file selection field 608 allows users to select the firmware/software that that is to be flashed into the device that is to be programmed. The program button 610 allows users to remotely initiate the programming of the DSP card by sending the program command causes the digital signal processor to take the necessary steps required to program the DSP card.

The various embodiments may be implemented as a single software package for each digital signal processor based printed circuit board, with each package including additional add-on files specific to each card/board/processor. In the various embodiments, data may be transmitted across the CAN medium in the form of CAN messages. Each CAN message may include a CAN message identifier, a data message, and/or a signaling messages. As discussed above, the various embodiments provide for using a programming message/signal to instruct a digital signal processor to automatically change the control of execution from an application code to a pre-stored boot code. The CAN message identifier may include a channel identifier, a card type identifier and a node id identifier, and the card type identifier and node id identifier may be used to uniquely identify a particular card in the CAN network. The data message may be used to transmit the application programs to the digital signal processor. In various embodiments, the data message may be used to transmit the application programs to the DSP one unit at a time, such as 8, 16, or 32 bytes at a time. In an embodiment, the digital signal processor 314 may be configured to send the computing device 302 a handshake message after receiving a certain number of CAN messages, such as after receiving 1024, 2048, or 4096 CAN messages. In various embodiments, the computing device 302 may be configured to halt transmission of the CAN messages after transmitting certain number of message (e.g., 1024 CAN messages), and wait for the reception of a handshake message before continuing transmissions.

Figure 7:
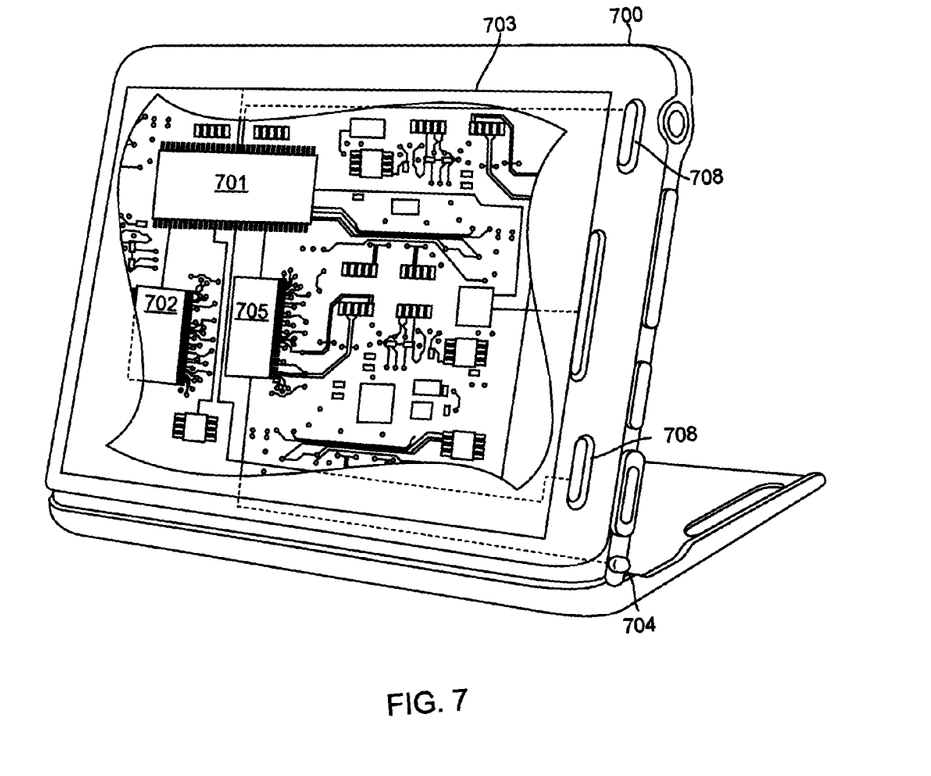
FIG. 7 is a system block diagram of a portable computing device suitable for use with any of the embodiments.

FIG. 7 is a system block diagram of a computing device suitable for use with any of the embodiments. A typical computing device 700 may include a processor 701 coupled to internal memory 702, to a display 703, and to a speaker 708. Additionally, the computing device 700 will include an antenna 704 for sending and receiving electromagnetic radiation and/or data messages to and from the Internet and/or other networks. The various embodiments may also be implemented on the on any of a variety of commercially available server devices, such as the server 800 illustrated in FIG. 8. Such a server 800 typically includes a processor 801 coupled to volatile memory 802 and a large capacity nonvolatile memory, such as a disk drive 803. The server 800 may also include a floppy disc drive, compact disc (CD) or DVD disc drive 804 coupled to the processor 801. The server 800 may also include network access ports 806 coupled to the processor 801 for establishing data connections with a network 812, such as a local area network coupled to other broadcast system computers and servers. Servers 800 may also include operator interfaces, such as a keyboard 808, pointer device (e.g., a computer mouse 810), and a display 809.

Figure 8:
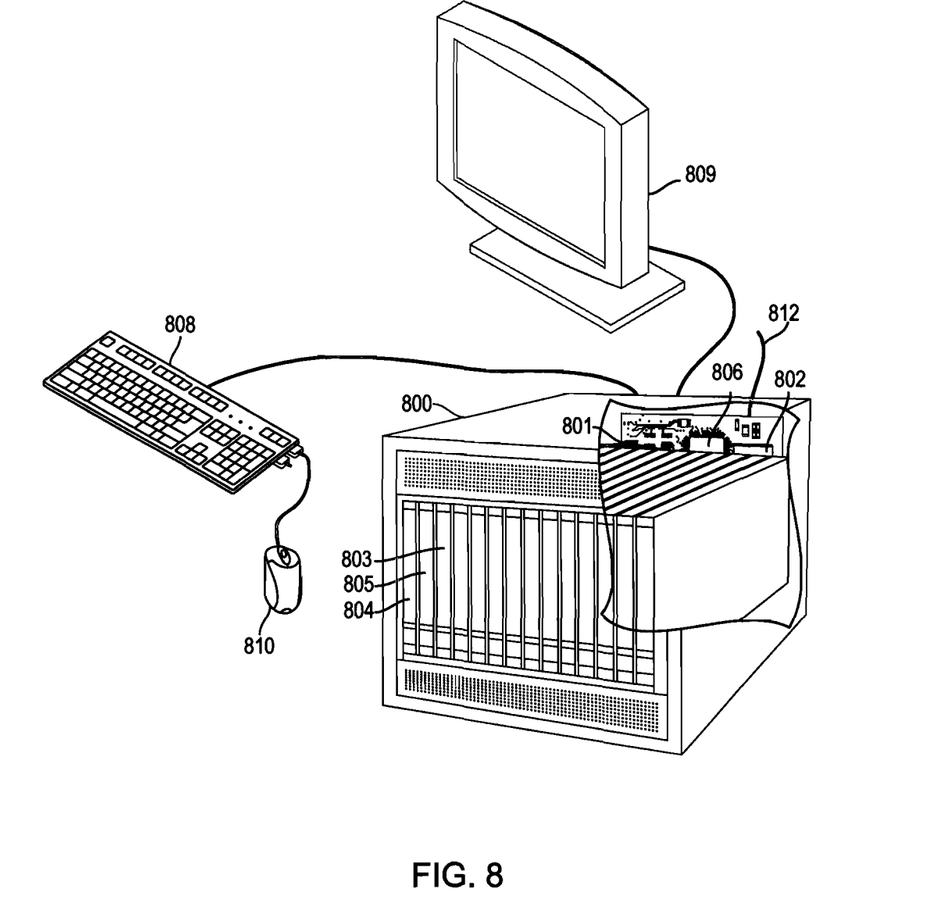
FIG. 8 is a system block diagram of a server computing device suitable for use with any of the embodiments.

The processors 701, 801 may be any programmable microprocessor, microcomputer or multiple processor chip or chips that can be configured by software instructions (applications) to perform a variety of functions, including the functions of the various embodiments described below. In some mobile receiver devices, multiple processors 2001 may be provided, such as one processor dedicated to wireless communication functions and one processor dedicated to running other applications. Typically, software applications may be stored in the internal memory 702, 802,803 before they are accessed and loaded into the processor 701, 801. The processor 701, 801 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the" is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A fuel cell system, comprising:
a fuel cell;
a control system connected to the fuel cell;
a controller area network;
a transceiver;
a controller area network to Ethernet (C2E) converter card connected between the transceiver and the controller area network, the C2E converter card being configured to perform operations comprising:
receiving data from the transceiver in an Ethernet-based message format and receiving data from the controller area network in a controller area network format; and sending the data from the transceiver to the controller area network in the controller area network format and sending the data from the controller area network to the transceiver in the Ethernet-based message format; and a processor connected to the controller area network and the control system, wherein:

the processor is a one or more pin chip including an on-chip Flash memory;

the processor is configured with more than one boot mode and is configured to boot to the Flash memory by a physical setting of the one or more pin of the chip;

the on-chip Flash memory includes firmware to control an operation of the control system;

the firmware includes a communication kernel and an application program; and the processor is configured with processor-executable instructions such that, without changing the physical setting of the one or more pin of the chip, the processor is configured to perform operations comprising:

executing the application program of the firmware to control the operation of the control system thereby controlling the operation of the fuel cell;

receiving a programming signal from the controller area network;

halting execution of the application program of the firmware to control the operation of the control system in response to receiving the programming signal from the controller area network;

erasing the application program of the firmware from the Flash memory in response to receiving the programming signal from the controller area network;

setting an update firmware flag in response to erasing the application program of the firmware;

sending a start programming acknowledgment signal via the controller area network in response to setting the update firmware flag;

restarting the processor in response to sending the start programming acknowledgment signal;

determining whether the update firmware flag is set after restarting the processor;

determining whether a data message is received in response to determining the update firmware flag is set after restarting the processor;

initializing a new application program based on received data message and storing the new application program as part of the firmware in the Flash memory in response to determining the data message is received;

receiving an application program cyclic redundancy check;

performing a cyclic redundancy check of all of the Flash memory after storing the new application program as part of the firmware in the Flash memory;

comparing the cyclic redundancy check of the Flash memory with the received application program cyclic redundancy check to determine whether the cyclic redundancy check of the Flash memory matches the received application program cyclic redundancy check;

unsetting the update firmware flag in response to determining the cyclic redundancy check of the Flash memory matches the received application program cyclic redundancy check;

restarting the processor in response to unsetting the update firmware flag; and executing the new application program of the firmware to control the operation of the control system in response to determining the update firmware flag is not set after restarting the processor thereby controlling the operation of the fuel cell.

2. The fuel cell system of claim 1, further comprising:

a server configured to update the firmware of the Flash memory of the processor by sending the programming signal and the data message to the controller area network via the transceiver.

3. A method for remotely updating firmware on a processor of a fuel cell system comprising a fuel cell, a control system connected to the fuel cell, a controller area network, a transceiver, and a controller area network to Ethernet (C2E) converter card connected between the transceiver and the controller area network, wherein the processor is connected to the controller area network and the control system, wherein the processor is a one or more pin chip including an on-chip Flash memory, wherein the processor is configured with more than one boot mode and is configured to boot to the Flash memory by a physical setting of the one or more pin of the chip, and wherein the on-chip Flash memory includes firmware to control an operation of the control system, the method comprising:

receiving data from the transceiver in an Ethernet-based message format at the C2E converter card;

receiving data from the controller area network in a controller area network format at the C2E converter card;

sending the data from the transceiver to the controller area network in the controller area network format from the C2E converter card;

sending the data from the controller area network to the transceiver in the Ethernet-based message format from the C2E converter card;

executing the application program of the firmware to control the operation of the control system thereby controlling the operation of the fuel cell;

receiving a programming signal from the controller area network;

halting execution of the application program of the firmware to control the operation of the control system in response to receiving the programming signal from the controller area network;

erasing the application program of the firmware from the Flash memory in response to receiving the programming signal from the controller area network;

setting an update firmware flag in response to erasing the application program of the firmware;

sending a start programming acknowledgment signal via the controller area network in response to setting the update firmware flag;

restarting the processor in response to sending the start programming acknowledgment signal;

determining whether the update firmware flag is set after restarting the processor;

determining whether a data message is received in response to determining the update firmware flag is set after restarting the processor;

initializing a new application program based on received data message and storing the new application program as part of the firmware in the Flash memory in response to determining the data message is received;

receiving an application program cyclic redundancy check;

performing a cyclic redundancy check of all of the Flash memory after storing the new application program as part of the firmware in the Flash memory;

comparing the cyclic redundancy check of the Flash memory with the received application program cyclic redundancy check to determine whether the cyclic redundancy check of the Flash memory matches the received application program cyclic redundancy check;

unsetting the update firmware flag in response to determining the cyclic redundancy check of the Flash memory matches the received application program cyclic redundancy check;

restarting the processor in response to unsetting the update firmware flag; and executing the new application program of the firmware to control the operation of the control system in response to determining the update firmware flag is not set after restarting the processor thereby controlling the operation of the fuel cell, wherein the method is performed without changing the physical setting of the one or more pin of the chip.

4. The method of claim 3, wherein receiving data from the transceiver in an Ethernet-based message format at the C2E converter card comprises receiving a plurality of data messages from the transceiver in an Ethernet-based message format.

5. The method of claim 4, further comprising converting the plurality of data messages into a plurality of controller area network (CAN) messages.

6. The method of claim 5, wherein each of the plurality of CAN messages include a CAN message identifier and a data message.

7. The method of claim 6, wherein at least one CAN message identifier includes a channel identifier, a card type identifier and a node identifier.

8. The method of claim 7, wherein the card type identifier and node identifier are extracted from the data messages and uniquely identify a particular card in the controller area network.

9. The method of claim 3, further comprising:

sending the programming signal and the data message from a server configured to update the firmware of the Flash memory of the processor to the controller area network via the transceiver;

wherein the processor and the server are physically isolated from one another and wherein the processor is placed in a programming mode and the new application program is received and installed by the processor without changing any setting of the one or more pin of the processor.

10. The method of claim 3, further comprising:

sending an updated firmware received acknowledgment signal after storing the new application program as part of the firmware in the Flash memory; and receiving a programming complete signal, wherein performing a cyclic redundancy check of all of the Flash memory after storing the new application program as part of the firmware in the Flash memory comprises performing a cyclic redundancy check of all of the Flash memory after storing the new application program as part of the firmware in the Flash memory in response to receiving the programming complete signal.

11. The fuel cell system of claim 1, wherein the processor is configured with processor-executable instructions to perform operations further comprising:

sending an updated firmware received acknowledgment signal after storing the new application program as part of the firmware in the Flash memory; and receiving a programming complete signal, wherein the processor is configured with processor-executable instructions to perform operations such that performing a cyclic redundancy check of all of the Flash memory after storing the new application program as part of the firmware in the Flash memory comprises performing a cyclic redundancy check of all of the Flash memory after storing the new application program as part of the firmware in the Flash memory in response to receiving the programming complete signal.

* * * * *